No. 657,470. Patented Sept. 4, 1900.
W. TWEEDDALE.
APPARATUS FOR PURIFYING WATER.
(Application filed June 4, 1900.)
(No Model.) 2 Sheets—Sheet 1.
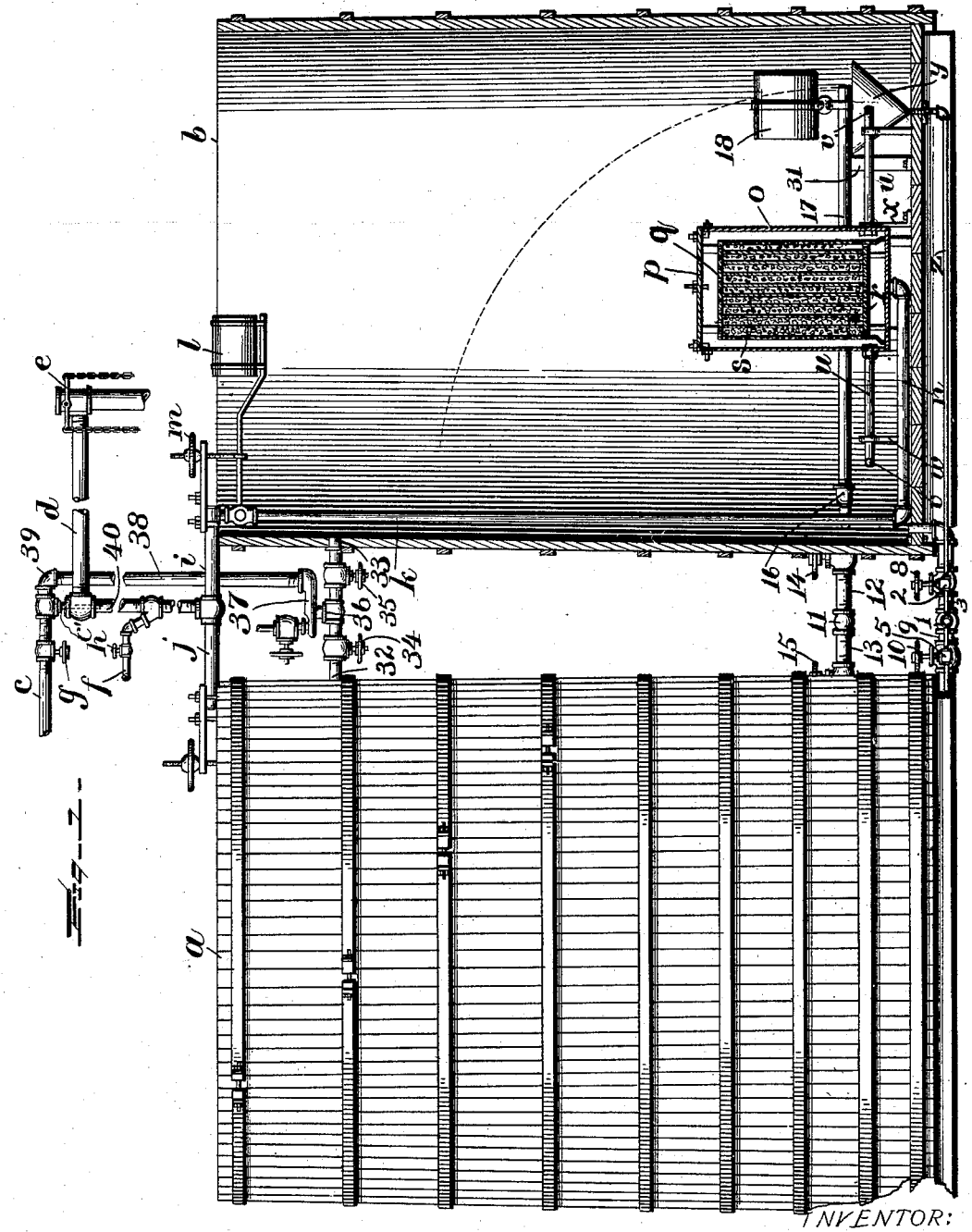
WITNESSES
L. C. Hills
Percy C. Bowen
INVENTOR:
William Tweeddale,
By Wilkinson & Fisher
Attorneys.

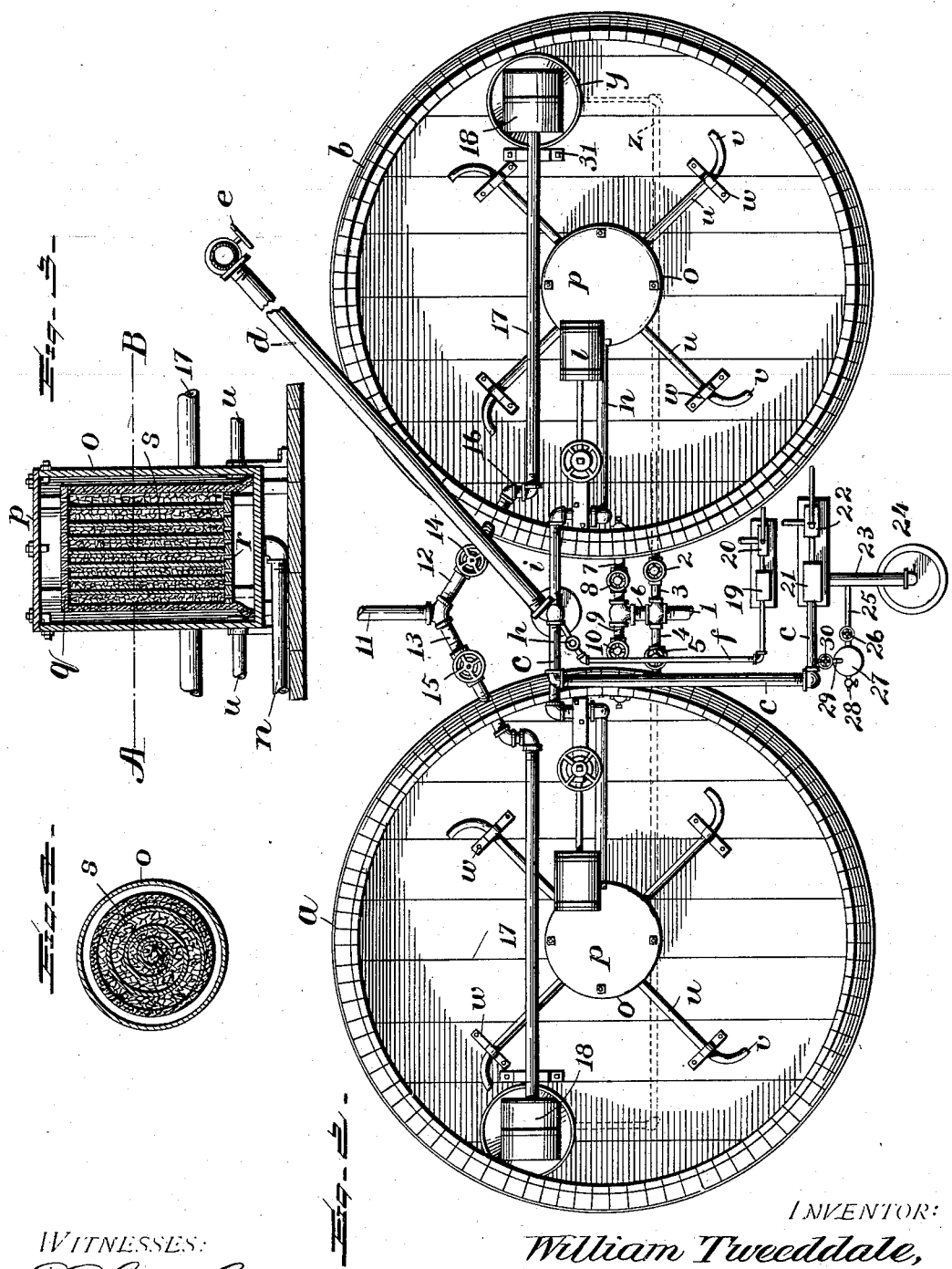

UNITED STATES PATENT OFFICE.

WILLIAM TWEEDDALE, OF TOPEKA, KANSAS.

APPARATUS FOR PURIFYING WATER.

SPECIFICATION forming part of Letters Patent No. 657,470, dated September 4, 1900.

Application filed June 4, 1900. Serial No. 19,017. (No model.)

*To all whom it may concern:*

Be it known that I, WILLIAM TWEEDDALE, a citizen of the United States, residing at Topeka, in the county of Shawnee and State of Kansas, have invented certain new and useful Improvements in Apparatus for Softening and Purifying Water; and I do hereby declare the following to be a full, clear, and exact description of the invention, such as will enable others skilled in the art to which it appertains to make and use the same.

My invention relates to apparatus for softening and purifying water.

One object of my invention is to change both the organic and inorganic substances which are in solution in the water under treatment to an insoluble state, in which condition said substances will settle and carry down all impurities, including bacteria.

A further object of my invention is to aerate the water, so that it may be suitable for drinking purposes.

With these objects in view my invention consists in the construction and combinations of parts, as hereinafter described and claimed.

In the accompanying drawings, Figure 1 is a side view of my apparatus, including two settling-tanks, one of said tanks being shown in section. Fig. 2 is a top plan view of the same. Fig. 3 is a vertical central section of the combined oxidizer and aerator, and Fig. 4 is a horizontal section of the same on the line A B of Fig. 3.

$a$ and $b$ represent tanks. Near the bottom of each of these tanks is a combined filter and mixer. It is of course obvious that, if desired, more than one of these may be used in each tank. The water which is to be purified is supplied to the tanks through the pipe $c$, provided with a valve $g$. This pipe $c$ has connected to it a vertical pipe 40, to which is connected an air-pipe $f$, provided with a valve $h$. The pipe 40 is divided into branches $i$ and $j$ near the top of the tanks, one branch leading to each tank. The horizontal branch $i$ is provided with a vertical branch $k$, to which is connected a horizontal branch $n$, which leads into the bottom of the filter and mixer $o$.

It may be here said that the arrangement of the apparatus in the two tanks is the same, so that the description for one will suffice for both.

The pipe $k$, near its upper portion, is provided with a valve, which is operated by a float $l$, the adjustable wheel $m$ serving to prevent said float from falling too far. When the tank $b$ is nearly full, the valve $l$ rising will cut off the flow of water through the pipe $k$.

The filter and mixer $o$ consists of a closed case having an imperforate top $p$. Inside this is located a spiral $s$, composed of iron, and within the coils of this spiral are loosely packed pieces of coke. Perforated plates $q$ and $r$ are located at the top and bottom, respectively, of this spiral. An open space is left between said spiral and the wall of the filter and mixer $o$. To this space are connected discharge-pipes $u$, provided with bent ends $v$, which pipes are fastened by clips $w$ to the bottom of the tank $b$. A discharge-pipe 11 for the purified water, provided with branches 12 and 13, in which are located valves 14 and 15, connects with the two tanks $a$ and $b$. The pipe 12, inside of the tank $b$, is provided with a pivotal union-joint 16, to which is attached the pipe 17, which carries the float 18 near its end. This pipe 17 is supported, when in its lowest possible position, by the brace 31. The object of this pipe and float-valve is to cut off the flow of the water into the purified-water-discharge pipe whenever the level of the water in the tank $b$ reaches a certain level, the purpose of this being to prevent the discharge of impure water into the pipe 11, as the impurities naturally settle to the bottom of the pipe. A sludge-funnel $y$ is located in the tank $b$, which funnel is connected by a sludge-pipe $z$ by means of the branch 3, provided with a valve 2, with a waste-pipe 1. A similar branch 4, provided with a valve 5, leads to the tank $a$. An additional discharge-pipe 7, provided with a valve 8, is connected with the bottom of the tank $b$, and by means of the branch 6 is connected with the waste-pipe 1. A similar branch 9, provided with a valve 10, connects with the tank $a$.

The apparatus is designed when water is fed into the tank to have said water mixed with air and at the same time to have it act as a condenser for the exhaust-steam, which is delivered through the pipe $d$. To this end, therefore, a small pipe or jet $c'$, connected with the pipe $c$, extends downward into the vertical pipe 40 a short distance below the opening of the pipe $d$, as shown in dotted lines in Fig. 1. This causes the water supplied through the pipe $c$ to be projected downward with some force into the current of air or air and steam in the pipe 40, resulting in a thorough mixture of the water and air and in the condensation of the steam. The aeration is accomplished by a small engine 20, which operates an air-compressor 19, forcing air through the pipe $f$ into the pipe 40, thereby aerating the water and at the same time acting as an injector. The water is delivered to the pipe $c$ usually by means of a pump 21, operated by a small engine 22, which pump sucks the water from a well 24 through a pipe 23. Connected to this pipe 23 is a branch pipe 25, provided with a valve 26, which pipe connects with a chemical-measuring tank 27, provided with a discharge-valve 28. This chemical-tank is connected with the pipe $c$ by branch pipe 29, provided with a valve 30. To provide for continuing the agitation of the water in the tanks after they are filled, water is taken from either tank at the points 32 and 33, with valves 34 and 35 connected by means of pipe 36 with a steam-jet pump 37, which forces the water through the pipe 38 to the pipe $c$, to which pipe 38 is connected by means of a bend 39. A gage-glass (not shown) may be provided on the outside of the chemical-measuring tank.

The operation is as follows: The water to be treated being first analyzed in order to find out the nature and amount of the impurities which it is desired to remove and the quantity of chemical reagents required to precipitate the various salts that are present in solution and to neutralize the acids or alkalies in the volume of water which the tank is known to contain being calculated, these reagents are put into the chemical-tank 27. In the water with which I have actually experimented the salts to be removed are usually lime, magnesia, and iron in the form of sulfates and carbonates, and organic matter in solution, the presence of which causes hardness in the water when used for washing, incrustation in steam-boilers, and are injurious to health. The reagents for these impurities are usually calcium and sodium hydrate. There may also be added a small quantity of a ferric salt, such as ferric oxid, which by reaction with various hydrates which may be present in the water will form a gelatinous ferric hydrate which aids mechanically the collection of impurities in the liquid. After the required amounts of reagents have been put into the tank 27 the tank $b$ is filled with water, which passes through the pipes $c$ 40 $i$ $k$ $n$, through the filter and mixer $o$, and out through the pipes $u$ $v$ into the tank $b$. At the same time air is forced in with the water through the pipe $n$, and, if desired, exhaust-steam may be supplied through the pipe $d$, so that the water which passes into the filters and mixers $o$ will be warm and aerated. At the same time the water as it is forced through the pipe $c$ is also forced through the tank 27, carrying with it into the pipe $c$ the chemical reagents in said tank. The water, therefore, as it enters the filter and mixer $o$ is warm and charged with air and suitable chemical reagents. Under the influence of the materials in the filter and mixer $o$, which at the same time acts as a filter and to thoroughly mingle the air and water together, most of the impurities are removed, so that the water which passes into the tank $b$ is very nearly pure. Some slight impurities, however, may escape through the filter and mixer $o$, and these impurities gradually settle to the bottom of the tank $b$, being continuously and slowly discharged through the sludge-funnel $y$ and discharge-pipe 7. After the tank has become full and the impurities in the water contained therein allowed to settle pure water may be drawn off through the pipe 11.

The tanks can be used successively, the water in one being allowed to settle while it is drawn off from the other. Of course a larger number of tanks than two could be used if the water in question is very impure and a long time is therefore required for sedimentation.

Various changes in the form and arrangement of the different parts of the apparatus might be made without departing from the spirit of my invention, and I wish it to be distinctly understood that I do not limit myself to the exact details shown.

Having thus described my invention, what I claim, and desire to secure by Letters Patent of the United States, is—

1. In an apparatus for softening and purifying water, the combination of a settling-tank with a combined filter and mixer, consisting of a case, an iron spiral located in said case and filtering material held between the coils of the spiral, substantially as described.

2. In an apparatus for softening and purifying water, the combination of a settling-tank and combined filter and mixer consisting of a case, an iron spiral supported in said case, perforated plates at each end of said spiral and filtering material in the coils of the spiral, substantially as described.

3. In an apparatus for softening and purifying water, the combination of a tank and combined filter and mixer located in said tank, consisting of a case, an iron spiral located in said case and filtering material in the coils of said spiral and means for delivering the water to be purified to said filter and mixer, substantially as described.

4. In an apparatus for softening and purifying water, the combination of a tank, a combined filter and mixer located in said tank consisting of an outer case, an iron spiral in said case, filtering material located in the coils of said spiral and perforated plates at the ends of said spiral, with means for delivering a mixture of air and water to said filter and mixer, substantially as described.

5. In an apparatus for softening and purifying water, the combination of a tank, a combined filter and mixer in said tank consisting of an iron spiral having filtering material in the coils thereof and means for delivering a mixture of air, water and steam to said filter and mixer, substantially as described.

6. In an apparatus for softening and purifying water, the combination of a tank provided with discharge and waste pipes, a combined filter and mixer in said tank consisting of an inclosing casing, an iron spiral located in said casing, filtering material in the coils of said spiral and perforated plates at the ends of said spiral, means for delivering mixture of air, steam and water to said filter and mixer, said aerator being also provided with discharge-pipes leading into said tank, substantially as described.

7. In an apparatus for softening and purifying water, the combination of a tank provided with waste and discharge openings, a combined filter and mixer in said tank, consisting of an inclosing casing, a spiral in said casing, filtering material in the coils of said spiral and perforated plates at the ends of said spiral, and means for delivering a mixture of water, steam, air and chemical reagents to said filter and mixer, substantially as described.

8. In an apparatus for softening and purifying water, the combination of a water-pump, a chemical-tank, an air-pump and a steam-pipe, all connected together, a settling-tank provided with waste and discharge outlets, a combined filter and mixer located in said settling-tank into which the water to be purified is discharged and consisting of a closed outer casing provided with inlet and outlet pipes, an iron spiral, filtering material in the coils of said spiral and perforated plates at the ends of said spiral, substantially as described.

In testimony whereof I affix my signature in presence of two witnesses.

WILLIAM TWEEDDALE.

Witnesses:
H. G. LARIMER,
J. G. SLONECKER.